United States Patent [19]
Kuwahara et al.

[11] Patent Number: 5,980,790
[45] Date of Patent: Nov. 9, 1999

[54] PROCESS FOR PRODUCING A COPOLYMER

[75] Inventors: Shojiro Kuwahara; Yasushi Higuchi; Shinichi Hieda; Masahiro Kurokawa, all of Kanagawa-ken, Japan

[73] Assignee: Mitsubishi Gas Chemical Company, Inc., Tokyo, Japan

[21] Appl. No.: 09/027,970

[22] Filed: Feb. 23, 1998

[30] Foreign Application Priority Data

Mar. 4, 1997 [JP] Japan .................................. 9-049207

[51] Int. Cl.⁶ .................................. B29C 47/76
[52] U.S. Cl. .................................. 264/37.13; 264/37.26; 264/101; 264/209.6; 264/211.24; 264/331.15; 264/331.18; 525/54; 526/65; 526/67; 526/68; 526/70; 526/71; 526/329.1; 526/329.2; 526/329.7
[58] Field of Search .................................. 264/211.24, 176.1, 264/211, 101, 211.21, 204, 209.6, 331.15, 331.18, 37.11, 37.13, 37.26; 525/54; 526/65, 67, 68, 70, 71, 329.1, 329.2, 329.7

[56] References Cited

U.S. PATENT DOCUMENTS

| | | |
|---|---|---|
| 3,751,527 | 8/1973 | Bortnick . |
| 3,992,500 | 11/1976 | Kruder et al. . |
| 4,065,532 | 12/1977 | Wild et al. . |
| 4,324,868 | 4/1982 | Maeda . |
| 4,772,667 | 9/1988 | Biletch et al. . |
| 5,047,188 | 9/1991 | Okada et al. .................... 264/211.24 |
| 5,204,425 | 4/1993 | Sekimoto . |
| 5,372,765 | 12/1994 | Chen et al. .................... 264/211.24 |
| 5,599,888 | 2/1997 | Higuchi et al. . |
| 5,719,242 | 2/1998 | Higuchi et al. . |

FOREIGN PATENT DOCUMENTS

| | | |
|---|---|---|
| 0 652 237 | 5/1995 | European Pat. Off. . |
| 0 691 351 | 1/1996 | European Pat. Off. . |
| 1 091 329 | 10/1960 | Germany . |
| 44-23506 | 10/1969 | Japan . |
| 55-16015 | 2/1980 | Japan . |
| 57-135814 | 8/1982 | Japan . |
| 57-153009 | 9/1982 | Japan . |

*Primary Examiner*—Jan H. Silbaugh
*Assistant Examiner*—Kenneth M. Jones
*Attorney, Agent, or Firm*—Frishauf, Holtz, Goodman, Langer & Chick, P.C.

[57] ABSTRACT

A high quality copolymer of styrene and methyl methacrylate is economically produced by polymerizing styrene and methyl methacrylate in a homogeneous solution of raw materials comprising methyl methacrylate, styrene, and an antioxidant, while the solution of raw materials is continuously supplied to a polymerization reactor including at least one complete-mixing type reaction tank, continuously removing the polymerization product from the polymerization reactor, supplying the polymerization product removed from the polymerization reactor directly to an extruder having a plurality of vents, and extruding a copolymer from the extruder, while volatile matter are removed through the plurality of vents.

20 Claims, 1 Drawing Sheet

PROCESS FOR PRODUCING A COPOLYMER

BACKGROUND OF THE INVENTION

1. Field of the Invention

The present invention relates to a process for producing a copolymer of methyl methacrylate and styrene having excellent transparency, weatherability, heat stability, and solvent resistance in accordance with a solution process.

2. Description of the Related Arts

Copolymers of methyl methacrylate and styrene have excellent solvent resistance, dimensional stability, and moldability and low water absorption in addition to excellent transparency, stiffness, and weatherability and beautiful appearance which methacrylic resins generally exhibit. Therefore, these copolymers can be used as materials which have low densities, can be handled easily, and are economical and are used in various fields, such as signs, displays, covers for lights, and other building materials and electric parts. These copolymers are superior to methacrylic resins as optical materials because of higher refractive index and better dimensional stability and advantageously used in the field of optical sheets in recent years.

Heretofore, batch suspension polymerization processes and continuous bulk polymerization processes were generally used as the processes for producing copolymers of methyl methacrylate and styrene.

In the suspension polymerization, copolymers having different compositions are formed with progress of the copolymerization because the process is conducted batchwise, and homogeneity of the produced polymer is lost. This causes problems in quality, for example, in that the product becomes a mixture of copolymers having different diffraction indices and shows inferior transparency with turbidity.

To solve the above problem, a process in which a monomer mixture comprising styrene and methyl methacrylate in a specific range of amounts is polymerized by adding a specific polymerization initiator and a specific chain transfer agent, is disclosed in Japanese Patent Application Laid-Open No. Showa 55(1980)-16015. However, the applicable composition of the copolymer is limited to a narrow range around the azeotropic composition. A process in which, after the conversion of methyl methacrylate reaches 80% or more, copolymerization of methyl methacrylate and styrene is conducted with removal of a portion of unreacted monomers to the outside of the reaction system, is disclosed in Japanese Patent Application Laid-Open No. Showa 57(1982)-153009. However, this process requires complicated procedures in the steps of recovery of the monomers and purification of the copolymer and is not practical.

Moreover, contamination of the product with materials used in the process, such as emulsifiers and suspension dispersants, cannot be prevented in the suspension polymerization, and the product is not suitable for applications in which excellent optical properties are required. The suspension process has another problem as an industrial process in that complicated production steps, such as filtration, washing, drying, and waste water treatment, are included.

As the process for improving the drawbacks of the suspension polymerization, continuous bulk polymerization and solution polymerization can be mentioned. These polymerization processes are attracting attention because high quality polymers exhibiting excellent optical properties can be obtained in a wide range of the copolymer composition.

To produce copolymers of methyl methacrylate and styrene in accordance with the continuous bulk polymerization, a process in which a monomer mixture of styrene and methyl methacrylate having a specific composition and containing a radical generating catalyst is supplied continuously to a loop type reactor with coils and pipes to polymerize the monomers in a homogeneous phase, and a produced polymer is separated after the polymerization product is taken out, is reported in Japanese Patent Publication Showa 44(1969)-23506.

However, this process has a drawback in that continuous operation of the polymerization with stable control at a high conversion is very difficult because of an automatic accelerating effect by the so-called "gel-effect" and an increase in the viscosity of the polymerization product, and the conversion can be kept at most at about 60%. Therefore, a large amount of energy is necessary in the step of recovery and recycling of unreacted monomers and removal of volatile matters for concentration of the polymer. The polymer tends to be colored or degenerated by heat history during these treatments.

On the other hand, it is known that, in the solution polymerization, the gel effect described above can be suppressed by a decrease in viscosity of the polymerization product, and the conversion is increased. However, the solution polymerization has problems in that, unless the amount of the solvent is kept to the minimum, the total amount of volatile matters is not much different from that in the bulk polymerization even when the residual amount of monomers in a polymerization product is decreased, and the energy required for removing volatile matters is not much different from that in the bulk polymerization, either, and that processes for recovery and recycling of the monomers and the solvent become more complicated.

In Japanese Patent Publication No. Showa 44(1969)-23506 described above, a solution polymerization process using a small amount of an inert liquid diluent is proposed. However, no specific examples are shown. As for the continuous solution polymerization process, a process in which a general use solvent, such as an alkylbenzene, an aliphatic hydrocarbon, an ester, or a ketone, and a stabilizer are added to a monomer mixture containing styrene and methyl methacrylate, and copolymerization is conducted continuously in a plurality of reactors, is reported in Japanese Patent Application Laid-Open No. Showa 57(1982)-135814.

However, the solvents described in the above reference show poor volatility or have unnecessarily high affinity with the polymer. The polymerization product must be treated generally at a high temperature exceeding 220° C. to remove volatile matters when copolymers of methyl methacrylate and styrene having a content of residual volatile matters of 0.3% or less should be obtained as required for practical application. When the polymerization product containing a large amount of unreacted monomers is pre-heated to a high temperature exceeding 220° C., a problem arises in that a large amount of low molecular weight polymers are formed to cause a wider molecular weight distribution, and fluidity under heating and transparency of the obtained polymer becomes inferior. Moreover, when a polymerization product which contains a solvent having poor volatility or a solvent having unnecessarily high affinity with the polymer is introduced directly into an extruder after pre-heating, a problem arise in that tubing of vents in the area of the inlet are choked with the resin composition, i.e., the so-called vent-up takes place, and difficulty in the operation and contamination of the product are caused.

SUMMARY OF THE INVENTION

The present invention has an object to solve the above problems and to provide a process for producing a high quality copolymer of styrene and methyl methacrylate economically advantageously by a polymerization reaction which is controlled with stability.

The present inventors found that, when methyl methacrylate and styrene are copolymerized in the presence of a specific amount of methanol, a high quality polymer can be produced with stability while a high productivity is maintained. The present invention has been completed on the basis of this knowledge.

Accordingly, the present invention provides a process for producing a copolymer of methyl methacrylate and styrene comprising polymerizing a monomer mixture comprising 10 to 90% by weight of methyl methacrylate and 90 to 10% by weight of styrene in the presence of a solvent by a continuous solution polymerization process in accordance with steps of:

(1) preparing a solution of raw materials comprising 71 to 97% by weight of the monomer mixture, 3 to 29% by weight of methanol as the solvent, and 10 to 5,000 ppm of an antioxidant;

(2) polymerizing the monomer mixture to a conversion of 55 to 95% by mol at a polymerization temperature of 100 to 180° C. in the condition of a homogeneous solution while the prepared solution of raw materials is supplied continuously to a polymerization reactor comprising one complete-mixing type polymerization tank and a polymerization product is taken out continuously from the polymerization reactor;

(3) keeping a temperature of the polymerization product taken out from the polymerization reactor at 100 to 200° C.;

(4) supplying the polymerization product directly to an extruder which has a plurality of vents and is set at a barrel temperature of 180 to 270° C., and separating and recovering most of volatile matters in the polymerization product through vents formed in the extruder between a driving part and an inlet of the polymerization product; and (5) extruding a copolymer from the extruder while a remaining portion of the volatile matters is removed through one or more vents formed in the extruder between the inlet of the polymerization product and an outlet of the copolymer at the tip of the extruder;

(6) said copolymer having a content of residual volatile matters of 1% by weight or less and a weight-average molecular weight of 80,000 to 300,000.

Figure 1:
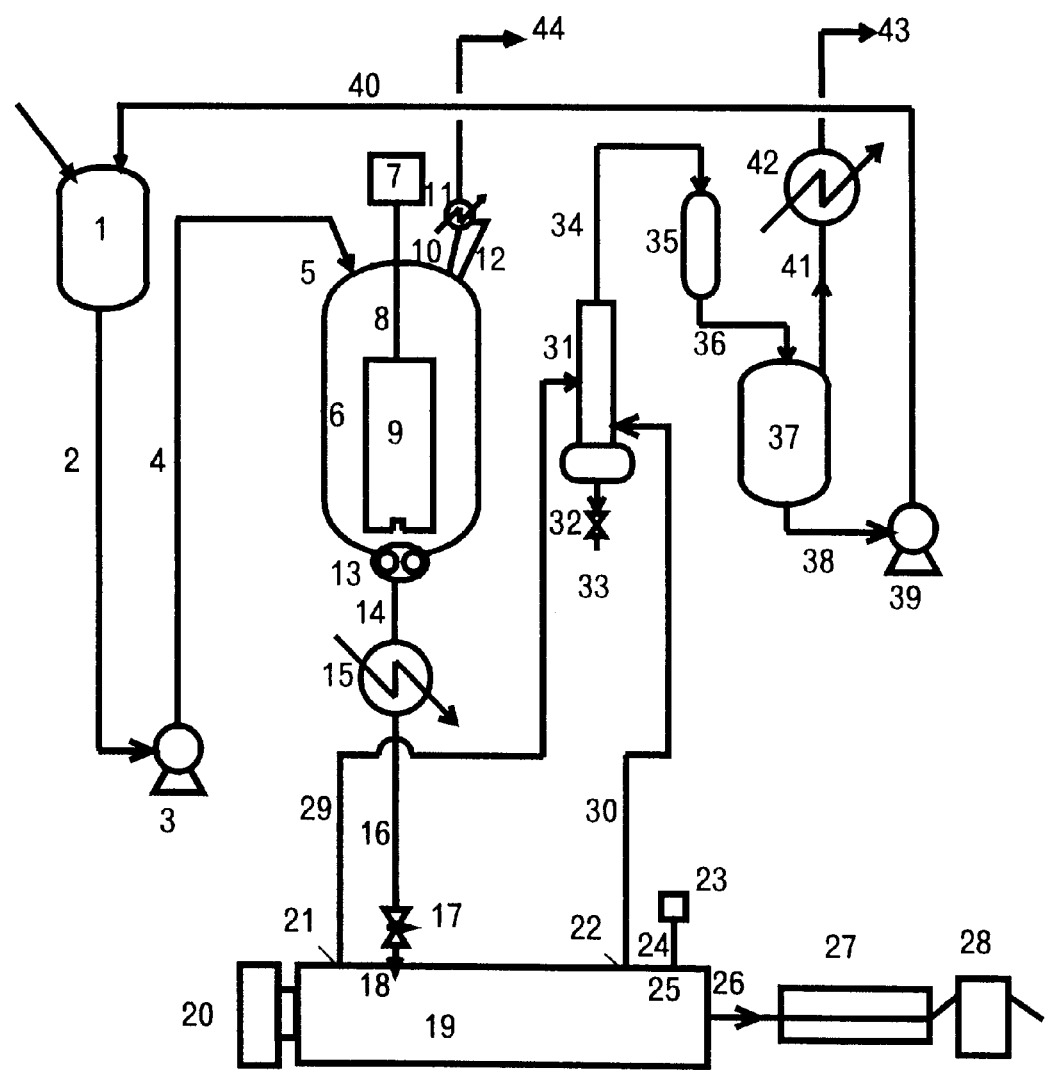
FIG. 1 shows a schematic diagram describing the apparatus used in Example 1.

Numbers in the figure has the following meaning:
1: a tank for mixing raw materials
2: a line
3: a quantitative pump
4: a line
5: an inlet
6: a tank reactor with a jacket
7: a motor
8: a shaft of a stirrer
9: a blade of a stirrer
10: a line to release vapor
11: a condenser
12: a refluxing line
13: a quantitative pump
14: a line
15: a heater
16: a line
17: a control valve
18: an inlet for a polymerization product
19: an extruder
20: a driving part of an extruder
21: a rear vent
22: a front vent
23: a tank for mixing additives
24: a line
25: an inlet for additives
26: a die
27: a water tank
28: a pelletizer
29: a line
30: a line
31: a distillation tower
32: a valve
33: a line
34: a line
35: a condenser
36: a line
37: a receiving tank
38: a line
39: a pump
40: a line
41: a line
42: a heat exchanger
43: a vacuum line
44: a line

DESCRIPTION OF THE PREFERRED EMBODIMENTS

Methanol used in the present invention as the solvent has the following characteristics:

(i) Methanol completely dissolves methyl methacrylate and styrene as the monomer components and has a sufficient solubility for the polymer at a temperature of 100° C. or higher. Therefore, methanol can keep the polymerization product homogeneous in a wide range of the concentration and is suitable as the solvent in the solution polymerization.

(ii) Methanol has a high volatility and hardly dissolves polymers derived from methyl methacrylate and styrene. Therefore, methanol can be separated easily from the polymerization product, and the amount remaining in the polymers is smaller than that of alkylbenzenes after removal of volatile matters.

(iii) Methanol has a boiling point lower than those of the monomers. Therefore, refluxing in the polymerization reactor is easier, and heat generated by the polymerization can be removed easily.

(iv) Detachment of the polymerization product is enhanced by the addition of methanol, and adhesion of the polymer to inner surfaces of a polymerization tank, a stirrer, and inner surfaces of pipings is suppressed. Therefore, degradation and contamination with gel derived from the polymerization product caused by unnecessary residence can be prevented.

(v) It is also known that coloring of the polymer can be decreased by the addition of methanol.

(vi) Methanol is industrially produced in a large amount as a solvent or a raw material and can be obtained at a low price.

From the reasons described above, the solution polymerization of methyl methacrylate and styrene using methanol as the solvent enables an increase in the conversion in comparison with conventional bulk polymerization or conventional solution polymerization using a solvent, such as an alkylbenzene, even when only one polymerization tank is used, and the productivity can be increased. Moreover, apparatuses for the step of removing volatile matters can be simplified. As the result, copolymers of methyl methacrylate and styrene can be produced economically advantageously.

The process of the present invention comprises successive steps of mixing of raw materials, polymerization, extrusion with removal of volatile matters, and recovery of volatile matters. The steps are described in this order in the following.

In the step of mixing of raw materials, monomer components, methanol, polymerization initiators, chain transfer agents, and antioxidants in respective specific amounts are mixed together and continuously supplied to a polymerization reactor. A recycled liquid from which impurities have been removed in the step of recovery of volatile matters is recycled into this step.

As the monomer components used in the present invention, a monomer mixture comprising 10 to 90% by weight of methyl methacrylate and 90 to 10% by weight of styrene is used without particular restriction. When the concentration of methyl methacrylate exceeds 90% by weight of the monomer mixture, or when the concentration of styrene exceeds 90% by weight of the monomer mixture, the properties as a copolymer of methyl methacrylate and styrene are not exhibited.

The combination of methyl methacrylate and styrene has an azeotropic composition where the composition of the monomers in the monomer mixture is the same as the composition of the monomer units in the obtained copolymer. When the composition of the monomers in the monomer mixture is different from the azeotropic composition, the composition of the monomers in the monomer mixture is not the same as the composition of the monomer units in the obtained copolymer. The relation between these factors can be determined easily in accordance with the method described in "Experimental Methods in Polymer Synthesis" by TAKAYUKI OHTSU and MASAYOSHI KINOSHITA (186 page, 1972, published by KAGAKU DOJIN).

It is important that methanol is used in an amount of 3 to 29 parts by weight when the monomer mixture is used in an amount of 71 to 97 parts by weight. It is preferable that methanol is used in an amount of 4 to 25 parts by weight when the monomer mixture is used in an amount of 75 to 96 parts by weight. It is more preferable that methanol is used in an amount of 5 to 20 parts by weight when the monomer mixture is used in an amount of 80 to 95 parts by weight. When the amount of methanol exceeds 29% by weight, productivity is decreased, and the process is disadvantageous with respect to energy because of increased load in the step of recovery of volatile matters. Moreover, the range in which the molecular weight can be adjusted becomes narrower. When the amount of methanol is less than 3% by weight, viscosity of the polymerization liquid is increased, and stable control of the polymerization becomes as difficult as that in the bulk polymerization. Moreover, the excellent property for removing volatile matters which is one of the characteristics of methanol as the solvent is not sufficiently exhibited.

In the present invention, an antioxidant is used to prevent decomposition and/or coloring caused by heat and oxidation in the step of extrusion with removal of volatile matters. The antioxidant is not particularly limited as long as the effect of preventing coloring can be exhibited. Examples of easily available antioxidants include phenolic antioxidants, antioxidants containing phosphorus, and antioxidants containing sulfur, such as antioxidants described in the catalogue of "ADEKASTABS" by ASAHI DENKA Co., Ltd., the catalogues of "SUMILIZERS" and "SUMISORBS" by SUMITOMO KAGAKU KOGYO Co., Ltd., and the catalogue of "POLYMER ADDITIVES" by NIPPON CIBA GEIGY Co., Ltd. Specific examples of the antioxidant include di-tert-butylhydroxytoluene, 4,4'-thiobis(6-tert-butyl-3-methylphenol), 2,2'-thiobis(6-tert-butyl-4-methylphenol), and tris(2,4-di-tert-butylphenyl) phosphite. The antioxidant may be used singly or as a combination of two or more types.

The antioxidant is added to the raw materials in an amount of 10 to 5,000 ppm, preferably 30 to 3,000 ppm, more preferably 50 to 2,000 ppm. When the amount is less than 10 ppm, coloring in the step of extrusion with removal of volatile matters cannot be prevented. When the amount exceeds 5,000 ppm, problems, such as choking of pipings by vaporization of the antioxidant in the extruder, arise.

In the present invention, it is possible that the polymerization is maintained with stability in the absence of any polymerization initiator because thermal polymerization of styrene can be utilized. However, a soluble polymerization initiator may also be added to accelerate the polymerization. As the polymerization initiator, any compound can be used as long as the compound is decomposed at the polymerization temperature and generates an active radical. It is necessary that the required conversion be achieved within the range of the mean residence time. A polymerization initiator which satisfies the half-life of 0.005 to 60 minutes, preferably 0.005 to 40 minutes, at the polymerization temperature is selected. Examples of such a polymerization initiator include di-tert-butyl peroxide, di-tert-amyl peroxide, benzoyl peroxide, tert-butylperoxy isopropyl carbonate, tert-butylperoxy dibenzoate, dicumyl peroxide, tert-amyl cumyl peroxide, tert-butylperoxy (2-ethylhexanoate), tert-amylperoxy (2-ethylhexanoate), tert-amylperoxy isononanoate, tert-hexylperoxy isopropyl carbonate, 2,2'-azobisisobutyronitrile, 2,2'-azobis(2-methylbutyronitrile), 1,1'-azobis-(cyclohexane-1-carbonitrile), and the like other azo compounds. The polymerization initiator may be used singly or as a combination of two or more types. The half-life can be obtained, for example, from the constants listed in "Organic Peroxides", Technical Data 13th Ed., published by NIPPON OIL AND FAT Co., Ltd., Technical Data by ATOCHEM YOSHITOMI Co., Ltd., and "Azo Polymerization Initiators" by WAKO PURE CHEMICAL INDUSTRIES Co., Ltd. The polymerization initiator is dissolved homogeneously in the monomer mixture in advance and supplied to the polymerization reactor. The concentration of the polymerization initiator in the monomer mixture is decided in such a manner that the polymerization achieves the prescribed conversion, and is generally 0.05 mol/liter or less.

To adjust the molecular weight of the polymer, a chain transfer agent may also be used. Examples of the chain transfer agent include 4-diphenyl-4-methyl-1-pentene (α-methylstyrene dimer), n-butyl-mercaptane, isobutylmercaptane, n-octylmercaptane, n-dodecylmercaptane, tert-dodecylmercaptane, and tert-butylmercaptane. The chain transfer agent may be used singly or as a combination of two or more types. The chain transfer agent is homogeneously dissolved in the monomer mixture in advance and supplied to the polymerization reactor. The concentration of the chain transfer agent in the monomer mixture is different depending on the prescribed molecular weight, and is generally 0.01 mol/liter or less.

The amounts of the polymerization initiator and the chain transfer agent described above can be decided with reference to the kinetic relation in the polymerization between the desired conversion and molecular weight and factors such as the concentrations of the monomers and the solvent, the polymerization temperature, the mean residence time, and the initiation efficiency. The kinetic relation can be obtained by the calculation in accordance with the methods described in "Chemistry of Polymer Synthesis" by TAKAYUKI OHTSU (1979, published by KAGAKU DOJIN) and "Engineering of Polymerization Reaction" by TATSUYA IMOTO and SHUITSU LI (1970, published by NIKKAN KOGYO SHINBUNSHA).

As the method of mixing the raw materials, any of a batch process or a continuous process may be used. When a batch process is used, two tanks for mixing raw materials are used, and raw materials are mixed and supplied using the two tanks alternatively. When a continuous process is used, the components are mixed together after the flow rate of each component is automatically adjusted to each prescribed value in separate lines.

It is necessary that oxygen be removed to a concentration of several ppm because the presence of oxygen dissolved in raw materials occasionally causes varied conversion and coloring of the product. Particularly when the polymer is used for optical applications, it is preferable that oxygen is removed to a concentration of 1 ppm or less. When a batch process is used, in general, an inert gas, such as nitrogen, is bubbled or dispersed by an apparatus, such as a disk atomizer, into the tank for mixing raw materials for a specific time. When a continuous process is used, in general, the solution of raw materials and an inert gas are mixed together using an in-line mixer disposed in the line, and the liquid and the gas are separated. Oxygen dissolved in the monomer mixture is substantially removed by these methods.

The solution of raw materials prepared as described above is supplied to a polymerization reactor after impurities are removed, preferably after filtration by a filter. As the filter, for example, a metal fiber filter or a sintered metal powder filter manufactured by NIPPON SEISEN Co., Ltd. or a polypropylene fiber filter manufactured by NIPPON POLE Co., Ltd. is preferably used. It is also possible that the solution of raw materials is supplied after cooling to control the polymerization with more stability.

The polymerization reactor used in the step of polymerization comprises one complete-mixing type reaction tank. A tank equipped with a stirrer is preferably used. As soon as the solution of raw materials is continuously supplied to the polymerization reactor and the complete-mixing is substantially achieved in the polymerization reactor, the polymer solution in the polymerization reactor is continuously taken out. As the blade of the stirrer used in the complete-mixing type tank, conventional paddle blades or anchor blades may be used. However, double helical ribbon blades, FULLZONE BLADES manufactured by SHINKO PANTEC Co., Ltd., SUN MELLOR BLADES and AR BLADES manufacture by MITSUBISHI HEAVY INDUSTRIES, Ltd., and MAXBLEND BLADES manufactured by SUMITOMO JUKIKAI KOGYO Co., Ltd. are preferably used.

The polymerization temperature is in the range of 100 to 180° C., preferably in the range of 120 to 175° C., more preferably in the range of 130 to 170° C. When the polymerization temperature is lower than 100° C., solubility of the polymer is decreased, and homogeneity of the polymerization liquid cannot be maintained. When the polymerization temperature exceeds 180° C., a problem arises in that low molecular weight polymers are formed in larger amounts. Moreover, the operation pressure is increased, and manufacturing cost of the reactor is increased to cause economic disadvantage.

The conversion at the outlet of the polymerization tank is set at 55 to 95% by mol, and the concentration of the polymer at the outlet of the polymerization tank is set at 50 to 90% by weight, preferably 55 to 85% by weight, more preferably 55 to 80% by weight. When the concentration of the polymer is less than 50% by weight, load in the step of recovery of volatile matters is increased, and such a concentration is disadvantageous. When the concentration exceeds 90% by weight, viscosity of the polymerization liquid is increased, and homogeneous mixing becomes difficult. This causes problems in that the temperature distribution in the polymerization tank is not homogeneous, and molecular weight distribution of the polymer becomes wider, and that the polymerization liquid cannot be taken out.

The mean residence time is in the range of 2 to 7 hours, preferably in the range of 2.5 to 7 hours, more preferably in the range of 3 to 7 hours, per one polymerization tank. When the residence time is less than 2 hours, the amount of the polymerization initiator must be increased to achieve the conversion of the polymerization in the range specified in the present invention, and the desired molecular weight cannot be achieved. When the residence time exceeds 7 hours, a polymerization tank having a larger volume is required, and this causes economic disadvantage.

As for the method for removing heat generated by the polymerization, a method of using sensible heat of the raw materials, a method of removing the heat by transfer to a jacket with a medium, or a method of utilizing heat of vaporization of methanol and monomer components in the reacting liquid can be used. It is preferable that a combination of these methods is used. When methanol is used as the solvent, the heat of vaporization per unit weight of volatile matters is larger than that in the bulk polymerization or in the solution polymerization using an alkylbenzene as the solvent, and the heat of polymerization can be effectively removed. Moreover, the polymerization pressure is generally adjusted around the vapor pressure of the polymerization product at the polymerization temperature because the heat of vaporization of vapor containing methanol as the main component is effectively utilized.

The polymerization liquid formed in the polymerization tank is separated into the polymer and volatile matters in the step of extrusion with devolatilization, and the volatile matters are removed so that the residual amount in the polymer is 1% by weight or less, preferably 0.5% or less, more preferably 0.3% by weight or less.

In the present invention, heat degradation of the polymer in the step of extrusion with devolatilization is kept to a minimum by supplying the polymerization product directly to an extruder having vents for devolatilization.

In the step of extrusion with devolatilization, it is necessary that the polymerization liquid be homogeneous, have fluidity, and be kept at or above the temperature which can supply the sensible heat required for devolatilization until the time immediately before devolatilization. In conventional methods, a polymerization product is preheated to 200 to 270° C., and then volatile matters are removed. In the present invention, devolatilization is conducted by introducing the polymerization product into an extruder at a low temperature of 100 to 200° C., preferably 130 to 200° C., more preferably 130 to 180° C., which is close to the polymerization temperature, because the effect of the high volatility of methanol is exhibited. When a polymerization product containing large amounts of unreacted monomers is preheated to 200 to 270° C., large amounts of low molecular weight polymers are formed, and the molecular weight distribution becomes wider. This causes deterioration in physical properties, such as fluidity under heating and transparency, of the obtained resin.

When the polymerization product is heated at a temperature higher than the polymerization temperature, it is necessary that the polymerization product be introduced into the extruder in a time as short as possible to prevent heat degradation of the polymerization product and/or increase in the formation of low molecular weight polymers. When the polymerization product is not homogeneously supplied to the extruder, troubles are caused inside the extruder. Therefore, it is preferable that the pressure inside the heater is kept at a pressure higher than the vapor pressure of the volatile matters in the polymerization product, and the polymerization product is directly supplied to the extruder through a control valve for adjusting the pressure.

The extruder to which the polymerization product is supplied has a plurality of vents, and the barrel temperature is set at 180 to 270° C., preferably at 180 to 260° C., more preferably at 190 to 250° C. Most of the volatile matters are separated and recovered through vents formed in the extruder between the driving part and an inlet for the polymerization product (these vents are referred to as rear vents, hereinafter), and the remaining portion of the volatile matters is removed through one or more vents formed in the extruder between the inlet for the polymerization product and an outlet for the polymer at the tip of the extruder (these vents are referred to as front vents, hereinafter). Thus, a copolymer of methyl methacrylate and styrene containing residual volatile matters in an amount of 1% by weight or less, preferably 0.3% by weight or less, can be obtained as the extruded product.

The pressure inside the rear vent of the extruder is kept in the range of 50 to 800 mmHg, preferably in the range of 100 to 300 mmHg. The volatile matters are smoothly recovered even under a pressure around an atmospheric pressure because of the relatively low boiling point of methanol and the azeotropic effect. "Vent-up" does not take place even under a reduced pressure because the volatile matters including methanol are vaporized quickly. The concentration of the volatile matters in the polymer composition in the vicinity of the inlet is kept at 1 to 10% by weight, preferably 1 to 6% by weight.

As the extruder used for devolatilization from the polymerization product, any extruder can be used as long as the extruder has a plurality of vents, can melt and mix the polymer composition from which most of volatile matters has been removed through the rear vents, and then can extrude, through a die, the polymer from which the remaining portion of the volatile matters has been removed through the front vents. A single screw or twin screw extruder which allows separate setting of the barrel temperature at various parts from the inlet for the polymerization product to the die is preferably used.

It is not necessary that the front vents are kept under a high vacuum because most of the volatile matters is removed through the rear vents. The pressure in the front vents is kept at 1 to 50 mmHg, preferably at 1 to 30 mmHg. When the extruder has a plurality of front vents, the pressure may be kept at the same value or at different values in the plurality of vents. It is preferable that the closer the vent to the outlet for the polymer at the tip of the extruder, the lower the pressure.

It is preferable that foreign substances are removed from the obtained polymer. Foreign substances can be removed by a conventional technology, such as attaching a metal net to a breaker plate at the die part of the extruder.

In the process of the present invention, additives may be supplied to the extruder and incorporated into the polymer composition. Examples of such additives include stabilizers, lubricants, ultraviolet light absorbents, coloring agents, and antistatic agents. The inlet for the additives is generally placed at a downstream position from the inlet for the polymer.

The polymer which contains the residual volatile matter generally in an amount of 1% by weight or less, preferably 0.5% by weight or less, more preferably 0.3% by weight or less, and can be advantageously used as a material for molded articles and extruded sheets can be obtained.

The weight-average molecular weight of the polymer is 80,000 to 300,000, preferably 80,000 to 200,000. When the weight-average molecular weight is less than 80,000, the required mechanical properties cannot be obtained. When the weight-average molecular weight exceeds 300,000, melt viscosity is increased, and molding by injection or extrusion becomes difficult.

In the step of recovery of volatile matters, the volatile matters separated from the polymer composition by vaporization in the step of extrusion with devolatilization are condensed by cooling and recovered.

The recovered liquid containing methanol and the unreacted monomers as the major components also contains other impurities, such as byproducts derived from the monomers such as oligomers, formaldehyde formed by oxidation of methanol, peroxides such as performic acid mainly derived from formaldehyde, and unreacted chain transfer agents. Formaldehyde is contained in methanol used as the raw material in an amount of 1 to 200 ppm. Peroxides, such as performic acid derived from formaldehyde not only causes increase in the conversion of the polymerization but also may cause polymerization in a receiving tank for the recovered liquid and the tank for mixing raw materials. Therefore, these impurities must be removed.

As the apparatus for separating these impurities, a flush tower or a conventional distillation tower is used, and substances having high boiling points are removed at the bottom of the tower. It is preferable that a small amount of oxygen is introduced to prevent polymerization in the tower. When oxygen is introduced, it is preferable that the gas containing the introduced oxygen is discharged through a condenser at the top of the tower to prevent accumulation of formaldehyde formed by oxidation of methanol. At the same time, it is necessary that an antioxidant be added into the tower to prevent polymerization of the monomers and suppress the formation of peroxides. The antioxidant is not particularly limited as long as the effect of preventing polymerization in the tower is exhibited. Examples of the easily available antioxidant include phenolic antioxidants, antioxidants containing phosphorus, hindered amine antioxidants, and antioxidants containing sulfur, which are described in the catalogue of "ADEKASTABS" by ASAHI DENKA Co., Ltd., the catalogues of "SUMILIZERS" and "SUMISORBS" by SUMITOMO KAGAKU KOGYO Co., Ltd., and the catalogue of "POLYMER ADDITIVES" by NIPPON CIBA GEIGY Co., Ltd.. Specific examples of the antioxidant include di-tert-butylhydroxytoluene, 4,4'-thiobis (6-tert-butyl-3-methylphenol), 2,2'-thiobis(6-tert-butyl-4-methyl-phenol), and tris(2,4-di-tert-butylphenyl) phosphite. The antioxidant may be used singly or as a combination of two or more types.

The recovered liquid from which impurities have been separated and removed is transferred to a storage tank and recycled as a part of the raw materials. When oxygen is absent in the storage tank, there is the possibility that polymerization takes place in the storage tank. When air is positively introduced into the storage tank, there is the possibility that formaldehyde is increased. Therefore, it is preferable that the storage tank is kept under a reduced pressure in the presence of oxygen. It is also preferable that the storage tank is cooled to 15° C. or lower, preferably 10° C. or lower, more preferably 5° C. or lower.

To achieve stable operation using the recovered liquid, it is necessary that the concentration of peroxide in the recovered liquid be kept at 50 ppm or less, preferably at 20 ppm or less, more preferably at 15 ppm or less, as benzoyl peroxide. It is also necessary that the concentration of formaldehyde in the recovered liquid be kept at 250 ppm or less, preferably at 200 ppm or less, more preferably at 150 ppm or less.

As described above, the process of the present invention enables controlling the operation with stability, using simplified apparatuses, and making heat history of a polymer milder. Therefore, a high quality polymer can be produced economically advantageously.

To summarize the advantages obtained by the invention, the process has a remarkable industrial advantage in that a high quality copolymer of methyl methacrylate and styrene can be produced with a high productivity under a stable operating condition from monomers comprising methyl methacrylate and styrene as the major components in accordance with a continuous solution polymerization process using methanol as the solvent.

EXAMPLES

The present invention is described more specifically with reference to examples in the following. However, the present invention is not limited by the examples.

Measurements in Examples were conducted in accordance with the following methods.

(1) The composition of a recovered material, the conversion, and the concentration of residual volatile matters in pellets were measured by the gas chromatography using a GC-380 type instrument manufactured by GL SCIENCE Co., Ltd. The conversion was obtained from the concentration of unreacted monomers in a polymerization product.

(2) The molecular weight of a polymer was measured by the gel permeation chromatography using an 8010 type instrument manufactured by TOSOH Co., Ltd.

(3) The total light transmittance (%) was measured in accordance with the method of ASTM D-1003 using a square sample, which had lengths of 50 mm and a thickness of 3 mm and was prepared by injection molding, by Z-SENSOR Σ80 manufactured by NIPPON DENSHOKU KOGYO Co., Ltd.

(4) The YI value was measured in accordance with the method of Japanese Industrial Standard K7103 using a square sample, which had lengths of 50 mm and a thickness of 3 mm and was prepared by injection molding, by the transmission method using Z-SENSOR Σ80 manufactured by NIPPON DENSHOKU KOGYO Co., Ltd.

(5) The melt flow rate (MFR) was measured in accordance with the method of ASTM D-1238 using MELT INDEXER manufactured by TOYO SEIKI SEISAKUSHO Co., Ltd. at 200° C. under a load of 5.00 kg.

(6) The concentration of peroxides in the recovered liquid was obtained as follows: the recovered liquid, ethanol, and water were added to a sodium hydrogencarbonate solution of diarsenic trioxide; the obtained solution was made into a complete aqueous solution by repeating concentration by heating and addition of water; sulfuric acid and sodium hydrogencarbonate were added to the resultant aqueous solution; after cooling the obtained solution, diarsenic trioxide present in an excess amount was titrated with a solution of iodine; and the amount of peroxides was calculated assuming the peroxides to be benzoyl peroxide.

(7) The concentration of formaldehyde was obtained from a light absorbance of a recovered liquid after the recovered liquid had been treated for color development by adding an acetic acid solution of 4-amino-3-hydrazino-5-mercapto-1,2,4-triazole and a solution of potassium hydroxide.

Example 1

FIG. 1 shows a schematic flow sheet of a 200L Apparatus having one tank equipped with a stirrer. The present example is described with reference to this flow sheet.

A fresh solution of raw materials containing methyl methacrylate, styrene, methanol, n-dodecylmercaptane, 1,1'-azobis(cyclohexane-1-carbonitrile) (half-life at 150° C.: about 0.27 minutes), and di-tert-butylhydroxytoluene was mixed with a recovered solution of raw materials in a tank for mixing raw materials 1. The solution obtained after mixing had the following composition: 90% by weight of a monomer mixture containing 64 parts by weight of methyl methacrylate and 36 parts by weight of styrene; 10% by weight of methanol; 670 ppm (3.0 mmol/liter) of n-dodecylmercaptane; 40 ppm (0.2 mol/liter) of 1,1'-azobis (cyclohexane-1-carbonitrile); and 1,000 ppm of di-tert-butylhydroxytoluene. Oxygen in the prepared solution was removed by blowing nitrogen into the solution for 30 minutes through a disk atomizer in the tank for mixing raw materials. Then, the solution was continuously supplied to a tank reactor with a jacket 6 through a line 2, a line 4, and an inlet 5 by a quantitative pump 3 at a prescribed flow rate so that the mean residence time was adjusted to 5 hours. The tank reactor with a jacket 6 was equipped with a shaft of a stirrer 8 extending from a motor 7, blades of a stirrer 9 attached to the shaft of a stirrer 8, and a line for cooling by refluxing.

The line for cooling by refluxing used for control of the reaction was composed of a line to take out vapor 10, a condenser 11, and a refluxing line 12. A vapor for refluxing which was supplied to a condenser 11 through the line to take out vapor 10 and the condensate was returned to the tank reactor 6 through the refluxing line 12. The condenser 11 had a valve for adjusting the pressure and was controlled by a suitable pressure controller so that the pressure inside the tank reactor with a jacket 6 was adjusted to about 9 kg/cm$^2$. By controlling the jacket temperature of the tank reactor with a jacket 6, the temperature of raw materials supplied to the tank reactor with a jacket 6, the amount of refluxed liquid effective for cooling, and the pressure inside the condenser 11, the temperature of the tank reactor with a jacket is controlled at 150° C., and the conversion of polymerization is controlled at 70% by mol. The molecular weight and the molecular weight distribution of the polymer produced in the tank reactor are also precisely controlled. The obtained polymerization product had the following composition: 63.0% by weight of the polymer, 19.2% by weight of methyl methacrylate, 7.8% by weight of styrene, and 10% by weight of methanol.

A portion of the polymerization liquid in the tank reactor with a jacked 6 was continuously supplied to a heater 15 through a line 14 by a quantitative pump 13 and kept at 150° C. The flow rate of raw materials supplied to the tank reactor with a jacket 6 and the flow rate of the polymerization product taken out from the tank reactor with a jacket 6 were controlled by the quantitative pump 3 and the quantitative pump 13 in such a manner that the height of the liquid in the tank reactor with a jacket 6 was held constant. The heater 15 was disposed at a position as close as possible to an inlet 18 of an extruder so that the polymerization product could be supplied to the extruder quickly.

An outlet of the heater 15 is connected to a control valve 17 through a line 16 and then directly to the inlet 18 of the extruder having vents 19. The inlet 18 was placed at a slightly downstream position from rear vents 21 of the extruder. The pressures at the heater 15 and the line 16 and the flow rates at the inlet 18 were adjusted to respective constant values by the quantitative pump 13 and/or the control valve 17, and the heated polymerization product was injected into the extruder having vents 19 which was set at a barrel temperature of 230° C. The pressure at the rear vents 21 was kept at 200 mmHg.

The polymer composition injected into the extruder having vents 19 was melted by heating while being transferred by a screw, and TINUVIN P (2-(5-methyl-2-hydroxyphenyl) benzotriazole, manufactured by NIPPON CIBA GEIGY Co., Ltd.) was supplied from a tank for mixing additives 23 through a line 24 and an inlet for additives 25. After volatile matters were further removed from the melt mixed polymer through front vents 22 kept at 10 mmHg, the polymer was continuously extruded through a die 26. The polymer strands extruded through the die 26 were cooled in a water tank 27 and formed into pellets by a pelletizer 28. The volatile matters vaporized when the polymerization product was injected into the extruder 19 were discharged from the rear vents 21 through a line 29. The volatile matters separated in the extruder 19 were discharged from the front vents 22 through a line 30. Volatile matters discharged from both vents of the extruder were supplied to a distillation tower 31. After substances having high boiling points were removed through a valve 32 and a line 33, volatile matters containing methanol and the unreacted monomers as the main components were condensed in a condenser 35 through a line 34 and then trapped into a receiving tank 37 which was cooled to 5° C. or lower through a line 36. The recovered liquid trapped into the receiving tank 37 was recycled to the step of mixing of raw materials through a line 38, a pump 39, and a line 40.

A portion of the recovered liquid which was trapped into the receiving tank 37 was taken out at a specific time interval, and the composition of the portion was analyzed. Into a portion of the taken out liquid, di-tert-butylhydroxytoluene was dissolved, and the obtained solution was added into the top of the distillation tower 31 in such an amount that the concentration of di-tert-butylhydrxytoluene at the bottom of the distillation tower 31 was about 100 ppm. Off-gas containing a small amount of formaldehyde was discharged to the outside of the system through a vacuum line 43. Thus, the loop of the process is completed.

The obtained polymer was colorless and transparent and contained the residual volatile matters as follows: 0.1% by weight of methyl methacrylate, 0.15% of styrene, and methanol in an amount lower than the detection limit (20 ppm). The of the obtained polymer was 0.7 g/10 min. The polymer in the polymerization product had a weight-average molecular weight of 162,000 and a polydisperse index (weight-average molecular weight/number-average molecular weight) of 2.0. The pellets obtained from the extruder had a weight-average molecular weight of 160,000 and a polydisperse index of 2.0.

The obtained polymer was molded into a circular disk of 100φ×3 mm using an ARBURG 75 t injection machine. Defective molding, such as silver streaks and foaming, did not take place after 100 shots of the molding. The molded disk had a total light transmittance of 92.2% and a YI of 0.6 in accordance with the transmission method. The concentration of peroxides in the recovered liquid was 0 ppm. The concentration of formaldehyde in the recovered liquid was 80 ppm.

Examples 2 to 6

The same operations as those conducted in Example 1 were conducted using the apparatus shown in FIG. 1. In all Examples, steps of mixing of raw materials, extrusion with devolatilization, and the devolatilization were controlled with stability, and polymers were obtained. The compositions of raw materials, conditions of polymerization, conditions of extrusion with devolatilization, properties of the obtained pellets, and properties of the molded products are shown in Table 1.

TABLE 1-1

| Example | 2 | 3 | 4 | 5 | 6 |
| --- | --- | --- | --- | --- | --- |
| Composition of raw materials | | | | | |
| MMA (part) | 51.0 | 18.7 | 40.0 | 38.0 | 76.8 |
| St (part) | 34.0 | 56.2 | 50.0 | 58.0 | 19.2 |
| methanol (part) | 15.0 | 25.0 | 10.0 | 5.0 | 4.0 |
| Polymerization initiator | AICN | AIBN | APEH | — | APEH |
| amount (ppm) | 20 | 110 | 40 | 0 | 40 |
| (mmol/liter) | 0.1 | 0.4 | 0.2 | 0 | 0.2 |
| Chain transfer agent | DM | OM | — | OM | DM |
| amount (ppm) | 220 | 340 | 0 | 200 | 440 |
| (mmol/liter) | 1.0 | 2.0 | 0 | 0.9 | 2.0 |
| Antioxidant | BHT | BHT | TBMP | BHT | BHT |
| amount (ppm) | 1000 | 700 | 700 | 1000 | 1000 |
| Conditions of polymerization | | | | | |
| polymerization temperature (° C.) | 150 | 130 | 140 | 160 | 170 |
| half-life of the initiator (min) | 0.27 | 0.37 | 0.27 | — | 0.02 |
| average residence time (hour) | 4.0 | 3.0 | 5.0 | 4.0 | 7.0 |
| conversion of polymerization (% by mol) | 65 | 78 | 72 | 68 | 74 |
| weight-average molecular weight (×10,000) | 18.3 | 14.1 | 27.3 | 22.2 | 12.0 |
| polydisperse index | 2.0 | 2.0 | 2.0 | 2.0 | 2.0 |
| Conditions of extrusion with devolatilization | | | | | |
| temperature at the inlet (° C.) | 160 | 150 | 150 | 170 | 160 |
| pressure at the rear vents (mm Hg) | 500 | 1000 | 800 | 350 | 600 |
| pressure at the front | 10 | 5 | 7 | 2 | 20 |

TABLE 1-1-continued

| Example | 2 | 3 | 4 | 5 | 6 |
|---|---|---|---|---|---|
| vents (mmHg) | | | | | |

TABLE 1-2

| Example | 2 | 3 | 4 | 5 | 6 |
|---|---|---|---|---|---|
| Properties of pellets | | | | | |
| weight-average molecular weight (×10,000) | 18.2 | 14.0 | 27.0 | 22.0 | 12.0 |
| polydisperse index | 2.0 | 2.0 | 2.0 | 2.0 | 2.0 |
| concentration of residual volatile matters | 0.23 | 0.27 | 0.21 | 0.25 | 0.22 |
| Properties of molded product | | | | | |
| defective molding | none | none | none | none | none |
| total light transmittance (%) | 92.1 | 91.6 | 91.9 | 91.8 | 92.5 |
| YI, transmission method | 0.6 | 0.6 | 0.6 | 0.6 | 0.5 |
| Concentration of impurities | | | | | |
| peroxide as benzoyl peroxide (ppm) | 0 | 0 | 0 | 0 | 0 |
| formaldehyde (ppm) | 80 | 60 | 70 | 40 | 100 |

Abbreviations in the table have the following meanings:
MMA: methyl methacrylate
St: styrene
AIBN: 2,2'-azobisisobutyronitrile
AICN: 1,1'-azobis(cyclohexane-1-carbonitrile)
APEH: tert-amylperoxy (2-ethylhexanoate)
DM: n-dodecylmercaptane
OM: n-octylmercaptane
B HT: di-tert-butylhydroxytoluene
TBMP: 4,4'-thiobis(6-tert-butyl-3-methylphenol)

Comparative Example 1

Using the same apparatus as that used in Example 1, the operations were conducted under the same conditions as those in Example 1 except that a solution containing 100% by weight of a monomer mixture composed of 64 parts by weight of methyl methacrylate and 36 parts by weight of styrene, 1,100 ppm (5.0 mmol/liter) of n-dodecylmercaptane, 20 ppm (0.1 mmol/liter) of 1,1'-azobis(cyclohexane-1-carbonitrile), and 1,000 ppm of di-tert-butylhydroxytoluene was used as the solution of raw materials. The conversion during the continuous operation varied widely between 72 to 85% and was unstable. The polymerization product was treated for removal of volatile matters in the same manner as that in Example 1. Vent-up frequently took place, to cause frequent trouble of cut strands. The pellets which could be obtained had a concentration of residual volatile matters of 0.66%, a weight-average molecular weight of 150,000, a polydisperse index of 2.1, and a total light transmittance of 91.8%. Thus, physical properties sufficient for practical application could not be obtained.

Comparative Example 2

The operations were conducted under the same conditions as those in Examples 1 except that di-tert-butylhydroxytoluene was not added to the raw materials or into the distillation tower. The concentration of peroxides in the recovered liquid was 68 ppm after 20 hours of the operation and increased to 100 ppm after 32 hours. When a recovered liquid was added to methanol after 44 hours, precipitates were formed, and the operation was stopped. It was shown by the GPC analysis of a recovered liquid that a polymer having a weight-average molecular weight of about 2,200,000 was formed in an amount of about 0.05%.

What is claimed is:

1. A process for producing an extruded product comprising a copolymer of methyl methacrylate and styrene comprising:
    (a) preparing a homogeneous solution comprising 71 to 97% by weight of a mixture of monomers, 3 to 29% by weight of methanol as solvent and 10 to 5,000 ppm of an antioxidant wherein said mixture of monomers comprises 10 to 90% by weight of methyl methacrylate and 90 to 10% by weight of styrene;
    (b) continuously supplying said prepared solution to a polymerization reactor comprising at least one complete-mixing polymerization tank, carrying out a continuous solution polymerization of the mixture of monomers to a conversion of 55 to 95% by mol at a polymerization temperature of 100 to 180° C. to form a polymerization product comprising said copolymer and volatile matters wherein said volatile matters comprises solvent and unpolymerized monomers and said copolymer has a weight-average molecular weight of 80,000 to 300,000;
    (c) continuously removing said polymerization product from the polymerization reactor while maintaining the temperature of the polymerization product removed from the polymerization reactor at 100 to 200° C. and supplying said polymerization product removed from the polymerization reactor directly to an extruder comprising a driving part disposed at a first end of said extruder, a polymerization product inlet disposed downstream of said driving part, a polymerization product outlet disposed at a second end of the extruder, wherein said second end is opposite to said first end, and a plurality of vents at least one of which is disposed in the extruder between the driving part and the polymerization product inlet, the extruder having a barrel temperature of 180 to 270° C., and separating and recovering substantially all of the volatile matters in the polymerization product through one or more of said vents, wherein the volatile matters are separated and recovered from the polymerization product in the extruder and recycled as raw materials to said homogeneous solution; and
    (d) extruding said copolymer from the extruder, wherein said copolymer has a content of residual volatile matters of 1% by weight or less.

2. The process according to claim 1, wherein the homogeneous solution comprises 80 to 95% by weight of the mixture of monomers and 5 to 20% by weight of methanol.

3. The process according to claim 1, wherein the polymerization temperature is 130 to 170° C.

4. The process according to claim 1, wherein the polymerization product is supplied onto a screw of the extruder through the polymerization product inlet at a temperature of 130 to 200° C.

5. The process according to claim 1, wherein the polymerization product is supplied onto a screw of the extruder through the polymerization product inlet at a temperature of 130 to 180° C.

6. The process according to claim 1, wherein the content of peroxides derived from the methanol in the recycled raw materials is adjusted to 50 ppm or less calculated as benzoyl peroxide.

7. The process according to claim 6, wherein the content of peroxides in the recycled raw materials is adjusted to 20 ppm or less calculated as benzoyl peroxide.

8. The process according to claim 1, wherein the content of formaldehyde derived from the methanol in the recycled raw materials is adjusted to 250 ppm or less.

9. The process according to claim 1, wherein the antioxidant is at least one antioxidant selected from the group consisting of di-tert-butylhydroxytoluene, 4,4'-thiobis(6-tert-butyl-3-methylphenol), 2,2'-thiobis(6-tert-butyl-4-methylphenol) and tris(2,4-di-tert-butylphenyl)phosphate.

10. The process according to claim 9, wherein the antioxidant is in an amount of 30 to 3,000 ppm.

11. The process according to claim 9, wherein the antioxidant is in an amount of 50 to 2,000 ppm.

12. The process according to claim 1, wherein the concentration of the polymerization product at the polymerization product outlet is 50 to 90% by weight.

13. The process according to claim 1, wherein the concentration of the polymerization product at the polymerization product outlet is 55 to 80% by weight.

14. The process according to claim 1, wherein the polymerizing in the at least one polymerization tank is carried out for 2 to 7 hours; and oxygen is introduced into the volatile matters separated and recovered from the polymerization product.

15. The process according to claim 14, wherein the residual volatile matter is in an amount of 0.5% by weight or less.

16. The process according to claim 15, wherein the residual volatile matter is 0.3% by weight or less.

17. The process according to claim 16, wherein the barrel temperature of the extruder is 180 to 260° C.

18. The process according to claim 16, wherein the barrel temperature of the extruder is 190 to 250° C.

19. The process according to claim 18, wherein said copolymer has a content of residual volatile matter of 0.5% by weight or less and has a weight average molecular weight of 80,000 to 200,000.

20. The process according to claim 6, wherein said copolymer has a content of residual volatile matter of 0.3% by weight or less.

* * * * *